Figure 1:
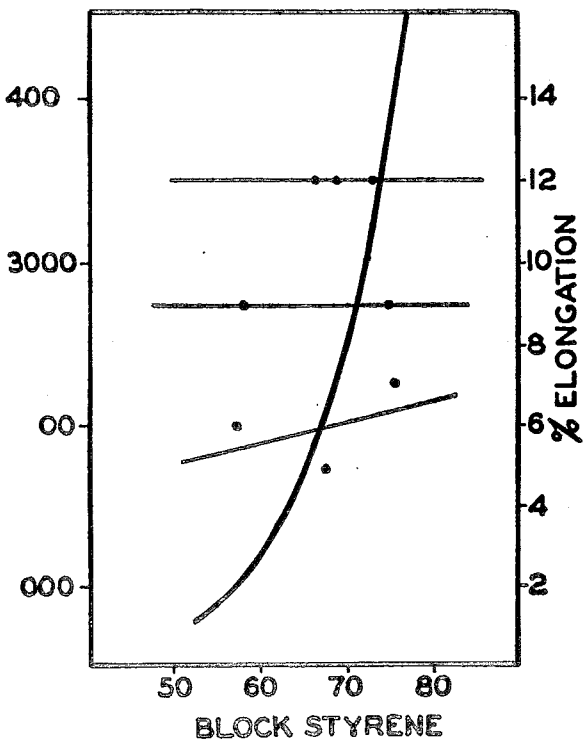
Figure 2:
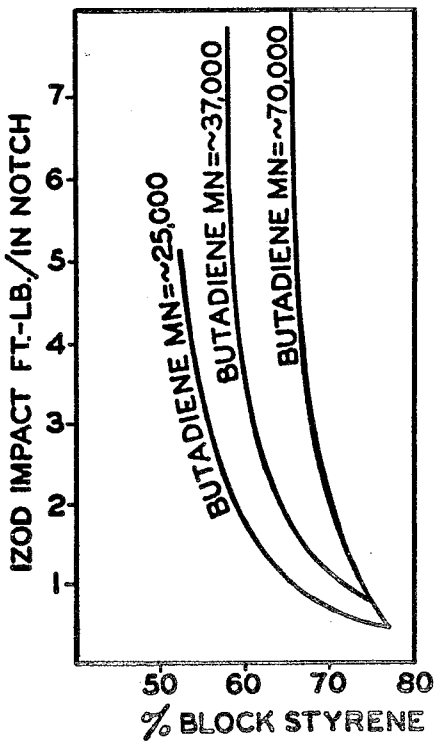
Figure 3:
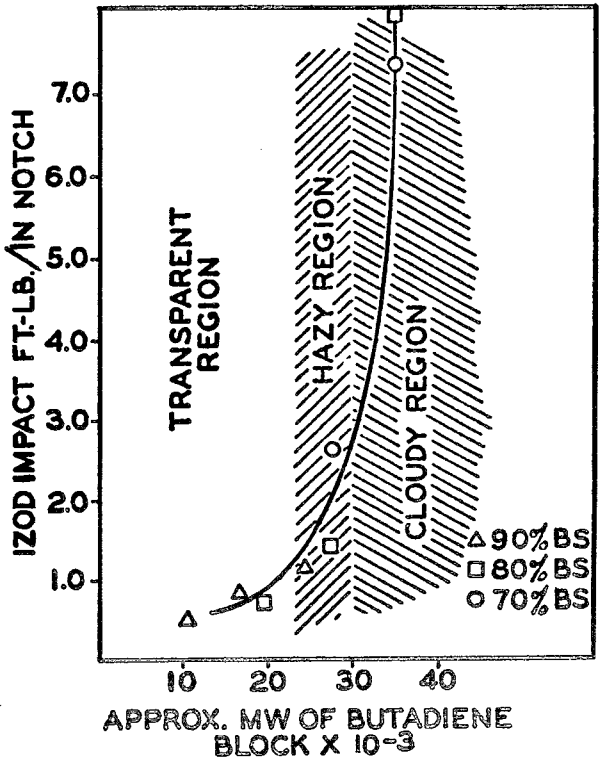

United States Defensive Publication [19] (H) [11] T967,004

Smith [43] Feb. 7, 1978

[54] TRANSPARENT IMPACT POLYSTYRENE PLASTICS OF DI-BLOCK COPOLYMERS

[75] Inventor: Robert Clarence Smith, Warren, Ohio

[73] Assignee: The Firestone Tire & Rubber Company, Akron, Ohio

[21] Appl. No.: 710,839

[22] Filed: Aug. 2, 1976

Related U.S. Application Data

[63] Continuation of Ser. No. 636,198, Nov. 28, 1975, abandoned, which is a continuation of Ser. No. 483,191, June 26, 1974, abandoned.

[51] Int. Cl.[2] ..... C08F 236/10; C08F 4/48

[52] U.S. Cl. ..... 526/173; 260/879; 526/340

[57] ABSTRACT

A transparent di-block copolymer of styrene and butadiene is produced which contains 70 to 90 percent of block styrene, or preferably 75 to 85 percent of block styrene. The copolymer is suitable for use in the manufacture of packaging films and molded items, including egg cartons, boxes of various types, window panes, etc.

1 Claim, 1 Sheet Drawing,

13 Pages Specification

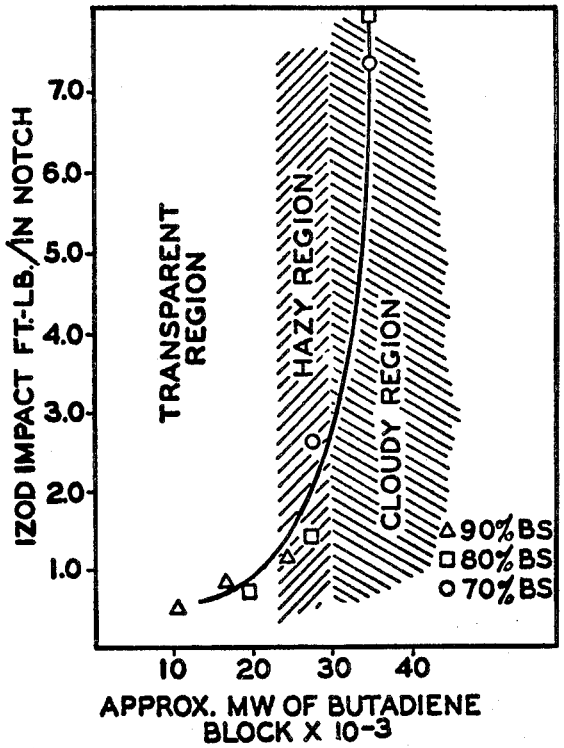

The file of this unexamined application may be inspected and copies thereof may be purchased (849 O.G. 1221, Apr. 9, 1968).